(12) United States Patent
Chug et al.

(10) Patent No.: US 10,122,854 B2
(45) Date of Patent: Nov. 6, 2018

(54) INTERACTIVE VOICE RESPONSE (IVR) USING VOICE INPUT FOR TACTILE INPUT BASED ON CONTEXT

(71) Applicant: Motorola Mobility LLC, Chicago, IL (US)

(72) Inventors: Himanshu Chug, Bangalore (IN); Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/453,012

(22) Filed: Mar. 8, 2017

(65) Prior Publication Data

US 2018/0241880 A1 Aug. 23, 2018

(51) Int. Cl.
- *H04M 11/00* (2006.01)
- *H04M 3/493* (2006.01)
- *H04M 1/725* (2006.01)

(52) U.S. Cl.
CPC ..... *H04M 3/4936* (2013.01); *H04M 1/72527* (2013.01); *H04M 1/72569* (2013.01); *H04M 1/72572* (2013.01)

(58) Field of Classification Search
CPC .............................. G10L 15/22; H04M 3/4936

USPC ........................................... 379/88.01–88.19
See application file for complete search history.

(56) References Cited

U.S. PATENT DOCUMENTS

| 7,515,695 | B1 * | 4/2009 | Chan | H04M 3/493 379/221.09 |
|---|---|---|---|---|
| 2015/0078538 | A1 * | 3/2015 | Jain | H04M 3/493 379/88.01 |
| 2015/0188959 | A1 * | 7/2015 | Sayed | H04L 9/0872 709/204 |
| 2015/0255063 | A1 * | 9/2015 | Talwar | H04M 1/271 704/255 |
| 2015/0264175 | A1 * | 9/2015 | Bumarch, III | H04M 3/4936 379/88.01 |
| 2016/0070533 | A1 * | 3/2016 | Foster | G06F 3/167 704/275 |
| 2017/0004828 | A1 * | 1/2017 | Lee | G06F 3/012 |

* cited by examiner

*Primary Examiner* — Solomon G Bezuayehu
(74) *Attorney, Agent, or Firm* — John L. Rogitz (57) ABSTRACT

When the context of a user indicates that tactile input to a mobile device on an interactive voice response (IVR) call is not feasible or desirable and the IVR downlink audio does not provide for a voice response option, the user nonetheless is prompted to respond by voice. The user's response is used to programmatically select the correct key by, e.g., sending the DTMF tone corresponding to the user's response on the uplink back to the IVR system.

20 Claims, 6 Drawing Sheets

FIG. 3  Logic

INTERACTIVE VOICE RESPONSE (IVR) USING VOICE INPUT FOR TACTILE INPUT BASED ON CONTEXT

FIELD

The present application relates to technically inventive, non-routine solutions that are necessarily rooted in computer technology and that produce concrete technical improvements.

BACKGROUND

Interactive voice response (IVR) is a technology that allows a computer to interact with humans through the use of voice prompts for a user to tactilely enter dual tone multi frequency (DTMF) tones using number keys on a keypad. In telecommunications, IVR allows customers to interact with a company's host system via a telephone keypad, after which services can be inquired about through the IVR dialogue. IVR systems can respond to user entry with prerecorded or dynamically generated audio to further direct users on how to proceed. IVR systems deployed in the network are sized to handle large call volumes and also used for outbound calling, as IVR systems are more intelligent than many predictive dialer systems.

SUMMARY

As understood herein, when the user's device is not completely accessible to the user, yet user would nevertheless like to use the device in a "no touch no see" mode to respond to IVR prompts, frustration arises. Many circumstances can arise in which it is not possible to complete an IVR call without being able to touch the device keypad.

Accordingly, in one aspect a storage that is not a transitory signal includes instructions executable by a processor to identify that an audible and/or visible interactive voice response (IVR) prompt on a communication downlink indicates (to a user) to select an option by using tactile input. The instructions are executable to receive voice input from a microphone, and based on the voice input from the microphone, to transmit at least one dual tone multi frequency (DTMF) tone on a communication uplink associated with the communication downlink.

In example embodiments, the instructions can be executable to, responsive to identifying that the IVR prompt indicates (to a user) to select an option by using tactile input, play on at least one speaker an audio prompt to speak a response to the IVR audio. The instructions may also be executable to identify that the IVR prompt on the communication downlink indicates (to a user) to select an option by using tactile input at least in part by converting an audio or visible IVR prompt to text and identifying whether the text satisfies a match condition with at least one text in a database.

In non-limiting examples, the instructions can be executable to identify a context of the device, and responsive to the context indicating touchless IVR, transmit the DTMF tone based on the voice input from the microphone. If desired, the instructions may be executable to, responsive to the context not indicating touchless IVR, not transmit the DTMF tone based on the voice input from the microphone. The instructions can be executable to dynamically load a grammar data structure to process the voice input from the microphone.

In another aspect, a method includes determining, at an electronic device, a context for an interactive voice response (IVR) system. The method also includes determining, at the electronic device, at least a portion of the IVR system necessitates tactile input based on the context, and dynamically loading a grammar set to process a voice-based response corresponding to a tactile input. The method further includes prompting a user of the electronic device for an audio input, receiving and processing, at the electronic device, the audio input, and performing a function at the electronic device based on the processed audio input such as sending a DTMF tone on an uplink.

In another aspect, an apparatus includes at least a first processor, at least one network adapter, and storage with instructions executable by the first processor for identifying that an interactive voice response (IVR) call on an IVR downlink does not provide for a voice response option. The instructions are executable for presenting a human-perceptible prompt to respond by voice, correlating a response to the human-perceptible prompt to a dual tone multi frequency (DTMF) tone, and sending the DTMF tone on an uplink back to an IVR system.

The details of present principles, both as to their structure and operation, can best be understood in reference to the accompanying drawings, in which like reference numerals refer to like parts, and in which:

DETAILED DESCRIPTION

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system;

hence, illustrative components, blocks, modules, circuits, and steps are sometimes set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g., that is not a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a wireless telephone, notebook computer, and/or other portable computerized device.

Figure 1:
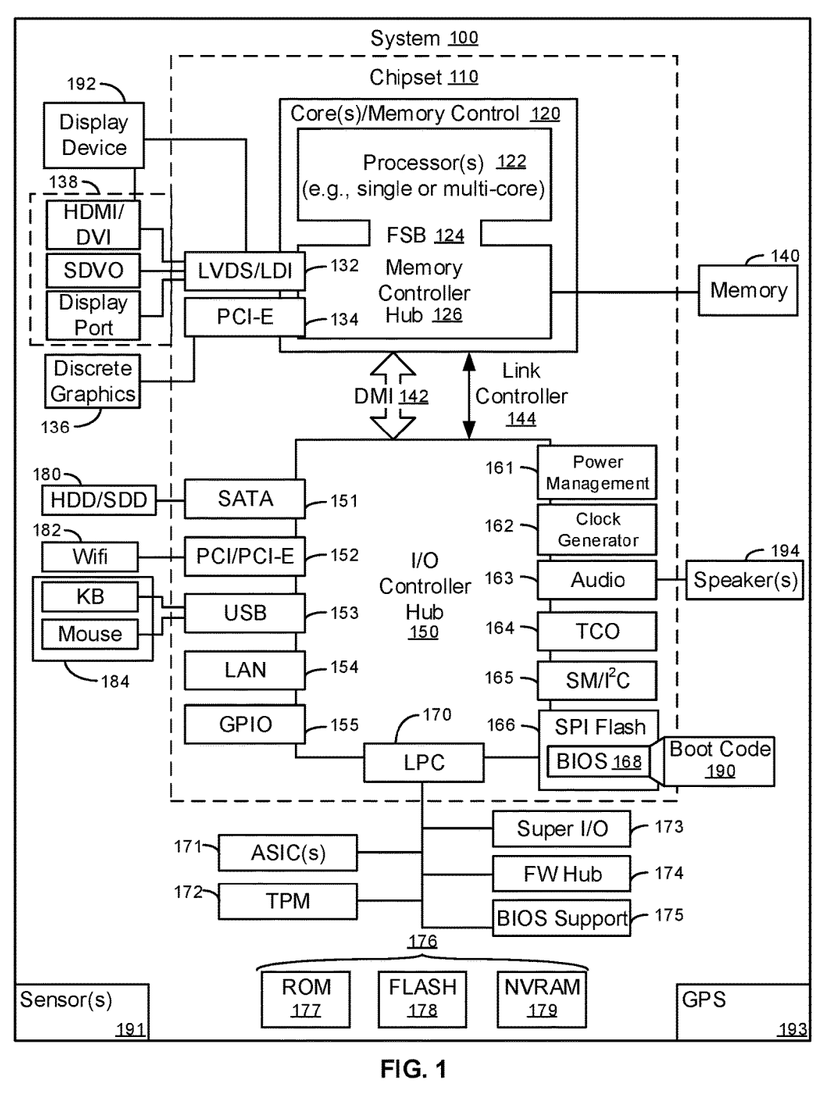
FIG. 1 is a block diagram of an example system in accordance with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated grapics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

The system 100 may also include one or more sensors 191 from which input may be received for the system 100. For example, the sensor 191 may be an audio receiver/microphone that provides input from the microphone to the processor 122 based on audio that is detected, such as via a user providing audible input to the microphone, so that the user may be identified based on voice identification. As another example, the sensor 191 may be a camera that gathers one or more images and provides input related thereto to the processor 122 so that the user may be identified based on facial recognition or other biometric recognition. The camera may be a thermal imaging camera, a digital camera such as a webcam, a three-dimensional (3D) camera, and/or a camera otherwise integrated into the system 100 and controllable by the processor 122 to gather pictures/images and/or video. The sensor 191 may also be, for instance, another kind of biometric sensor for use for such purposes, such as a fingerprint reader, a pulse monitor, a heat sensor, etc.

The sensor 191 may even be a motion sensor such as a gyroscope that senses and/or measures the orientation of the system 100 and provides input related thereto to the processor 122, and/or an accelerometer that senses acceleration and/or movement of the system 100 and provides input related thereto to the processor 122. Thus, unique and/or particular motion or motion patterns may be identified to identify a user as being associated with the motions/patterns in accordance with present principles.

Additionally, the system 100 may include a location sensor such as but not limited to a global positioning satellite (GPS) transceiver 193 that is configured to receive geographic position information from at least one satellite and provide the information to the processor 122. However, it is to be understood that another suitable position receiver other than a GPS receiver may be used in accordance with present principles to determine the location of the system 100. In some embodiments, the GPS transceiver 193 may even establish a sensor for use in accordance with present principles to identify a particular user based on the user being associated with a particular location (e.g., a particular building, a particular location within a room of a personal residence, etc.)

It is to be understood that an example client device or other machine/computer may include fewer or more features than shown on the system 100 of FIG. 1. In any case, it is to be understood at least based on the foregoing that the system 100 is configured to undertake present principles.

Figure 2:
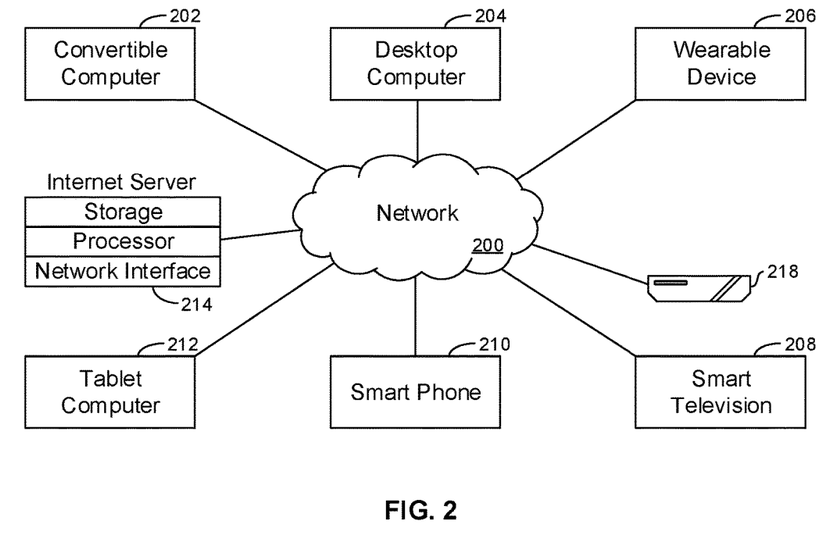
FIG. 2 is a block diagram of an example network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a server 214 such as an Internet server that may provide cloud storage accessible to the devices shown in FIG. 2, and a game console 218. It is to be understood that the devices shown in FIG. 2 are configured to communicate with each other over the network 200 to undertake present principles.

Figure 3:
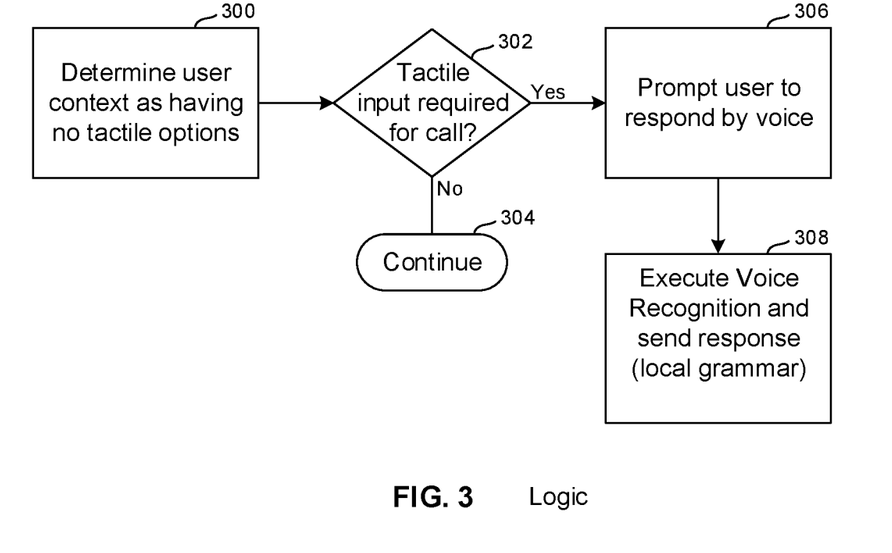
FIG. 3 is a flow chart of example logic.

FIG. 3 illustrates logic that can be implemented by a device such as but not limited to any one or more of the processors in any one or more of the devices disclosed herein. Commencing at block 300, the user's context is determined as rendering tactile input undesirable or infeasible, and thus that a "touchless context" exists. Examples of such context include the user driving a vehicle, the user walking with the mobile device for which IVR is sought to be used stowed in a bag or pocket, perhaps with the user wearing a headset communicating with the mobile device using Bluetooth, or the user having activated touchless IVR.

Examples of sensing such context include but are not limited to determining that a touchless IVR context exists at block 300 when Bluetooth communication is activated between the mobile device and a wireless headset. Or, touchless IVR context may be identified based on signals from a GPS receiver in the mobile device indicating that the user is moving at walking speed. A combination of both conditions (walking speed and Bluetooth communication with a headset) may be used in which both must be present to implement touchless IVR mode.

Yet again, touchless IVR context may be returned responsive to a combination of other sensors, such as a GPS sensor in the mobile device indicating motion above a threshold to indicate driving speed coupled with Bluetooth communication between a vehicle and the mobile device, based on the inference that a mobile device wirelessly communicating with a vehicle belongs to the driver of the vehicle. Or, vehicle speed may be sensed along with signals from an orientation sensor such as an accelerometer or gyroscope indicating that the mobile device is relatively stationary and thus that it may be mounted in a holder in the vehicle, which typically is where a driver might place his or her device.

Figure 4:
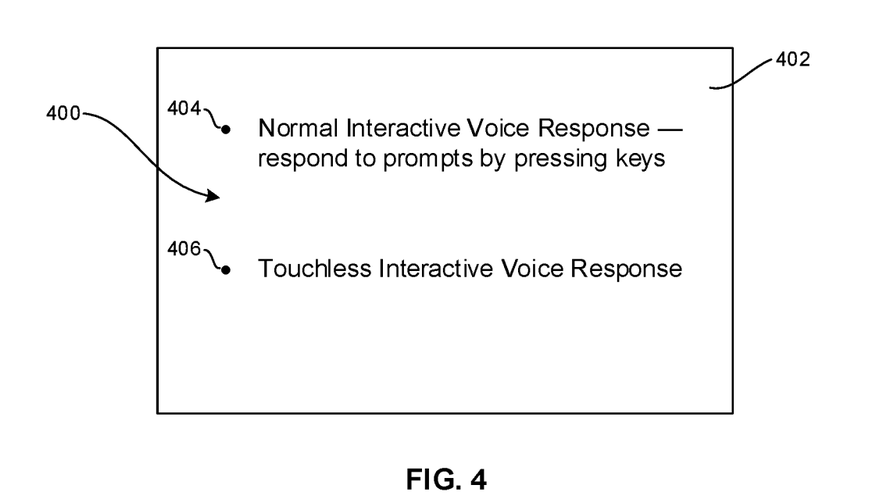
FIG. 4 is a screen shot of an example user interface (UI) for activating touchless IVR.

Yet again, the user may manually invoke the touchless IVR mode. Referring briefly to FIG. 4, a UI 400 may be presented on a display 402 of the device with a first selector 404 selectable to invoke standard IVR, in which tactile response to voice prompts is enabled. The UI 400 may also include a second selector 406 in which the touchless IVR mode described herein is enabled, if desired disabling tactile response. The example context determinations above are illustrative and not necessarily limiting.

Returning to FIG. 3, once it has been determined that the user's context indicates a touchless IVR mode, the touchless IVR mode described further hereunder may be enabled. At decision diamond 302, it is determined whether an IVR call requires a tactile input from the user on the mobile device carrying the IVR call.

In one example embodiment, determining whether an IVR call requires a tactile input may be undertaken by executing a speech-to-text (STT) algorithm on the downlink channel over which IVR audio is received. The (typically automated) audio IVR prompts are converted to text and the text compared to a limited grammar to determine if a tactile response is being demanded of the user. For example, the text string converted from downlink IVR audio of "press [numeral]" may trigger a positive outcome for the test at decision diamond 302. Other entries in the database that, if matched by the text of the STT conversion process indicate tactile response is being demanded, can include "to select", "if you want", and other such common IVR prompts in automated IVR calls.

In another example embodiment, determining whether an IVR call requires a tactile input may be undertaken by executing screen scraping of a user interface (UI) presented on the recipient device by visual IVR in the downlink channel over which IVR graphic information is received. The layouts/views associated with the downloaded IVR graphic information are identified in the graphic with text, and the text compared to a limited grammar to determine if a tactile response is being demanded of the user. For example, the text string converted from downlink IVR graphic of "press [numeral]" may trigger a positive outcome for the test at decision diamond 302. Other entries in the database that, if matched by the text of the careen scraping process indicate tactile response is being demanded, can include "to select", "if you want", and other such common IVR prompts in automated IVR calls.

Note that in some embodiments, even if the context indicates touchless response and the IVR demand menu indicates tactile input is being demanded (e.g., by using the word "press" as discussed above), the logic following block 302, with the exception of block 304, may not be implemented when, for example, the STT conversion reveals that the IVR downlink contains the phrase "or speak". In such a case, the IVR system on the downlink itself provides for a capability of voice input and, thus, the logic described further below need not be implemented.

Thus, if the IVR system itself provides for voice input, or if no IVR prompt identifying (e.g., by demanding) tactile input is determined at decision diamond 302, the process may continue at state 304, continuing to monitor for converted IVR downlink demands for tactile entry. On the other hand, if an IVR prompt demanding tactile input is determined at decision diamond 302, the process may move to block 306 to generate an audible prompt to the user to respond by voice to an IVR demand for input. In such a case the microphone of the device is activated to capture the user's voice response. If desired, playing the audio IVR prompt in the downlink or presenting on a display the visual IVR graphics in the downlink may be suppressed by the mobile device executing the logic of FIG. 3, with only the prompt generated locally at state 306 being played.

In other embodiments, at block 306 IVR audio in the downlink may not be suppressed, so it may be assumed that the user has heard the IVR demand for tactile input that was converted to text as described above, and so is aware of the options being given. Thus, the prompt at block 306 may simply be a terse request to "please speak a response to the options you just heard". Or, if desired the audible IVR demand including various options with corresponding number keys may be repeated at block 306.

Proceeding to block 308, voice recognition is executed on the user's response and then sent via the communication uplink to the IVR system. This may be done by programmatically "pressing" the key indicated by the user's voice to send the appropriate DTMF tone back to the IVR system on the uplink associated with the downlink on which the IVR demand for tactile input was received at decision diamond 302. That is, the processor generates the same tone it would have generated has the user's response been a press on the corresponding key. Note that "downlink" and "uplink" do not necessarily refer to separate channels but rather to a notional two-way communication link between a source of the IVR prompts and the mobile device of the user, regardless of the specific protocol or medium or communication system being employed.

Using present principles the user, in lieu of speaking a number (which he might have forgotten, for example, after listening to a relatively length of options) can input more generic responses via voice input. For example, the user may recall the name of an option more easily than its number after listening to a list of options, and thus may elect to speak the name of the option instead of its number.

Figure 5:
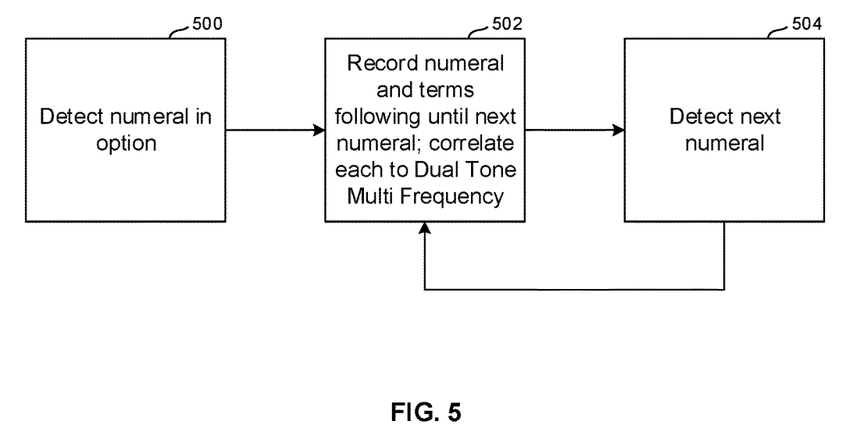
FIG. 5 is a flow chart of example logic for dynamically creating an IVR grammar.

Refer now to FIG. 5 and consider the example list of options that includes "press 0 for emergency, press 1 for pediatrician, press 2 for gynecologist, or press 4 for neurologist." In such a scenario, the user desiring to be connected to a pediatrician can speak "one" or "pediatrician". To this end, at block 308 a dynamic grammar database may be loaded catering to spotting specific IVR option responses for improving local command spotting based on, e.g., detecting a numeral in the visible or audio IVR downlink at block 500 and recording the IVR word options following the numeral at block 502. The numeral is correlated with the word options following it along with, for example, the DTMF tone associated with the key on a telephone keypad corresponding to the numeral.

This correlation can be done until another numeral is detected in the IVR downlink at block 504, in which case the process loops back to block 502 to correlate that numeral, along with its corresponding DTMF tone, with words in the audio IVR menu or in the visible IVR graphics following that second numeral. In this way, the logic correlates the IVR options with the corresponding numbers (and, if desired, DTMF tones), giving the user the option to use either. This spotting would not require remote spotting as in the case of IVR which takes speech recognition as inputs. Essentially, a limited grammar database is created on the fly which corresponds to the detected IVR call options and variants associated with specific tactile input. Thus, to enable voice assistance during an active IVR call, the logic being executed by the device may open a local voice recognition channel temporarily, parse the user's input, map it to the IVR actions, and then emulate the tactile input in the device by programmatically pressing the appropriate keys.

Figure 6:
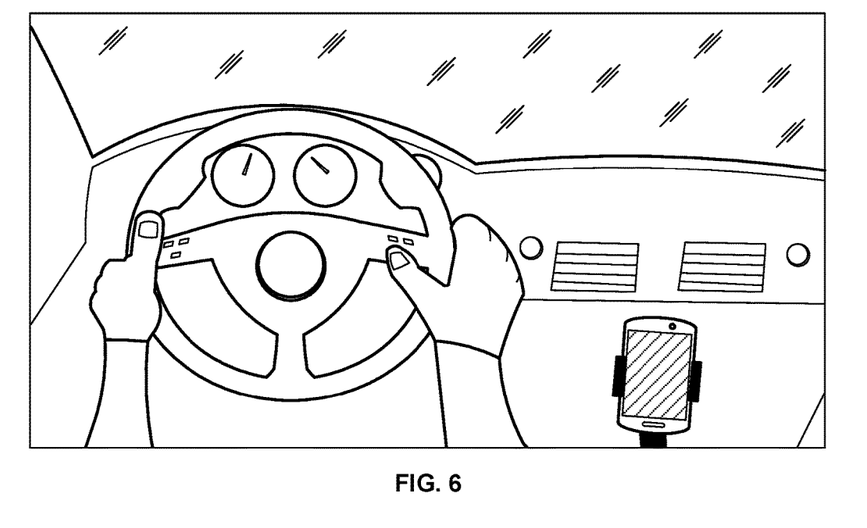
FIGS. 6-8 illustrate various use cases in which present principles facilitate IVR response on the part of users who cannot touch the keypads on their mobile devices.
Figure 7:
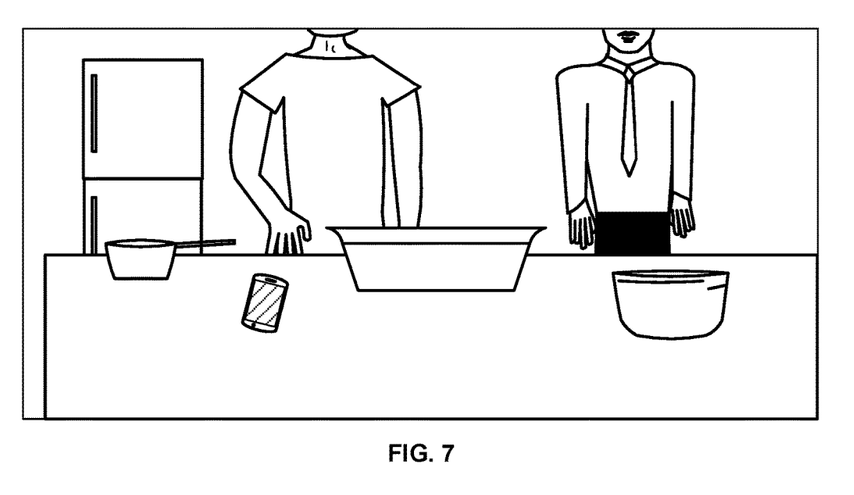
Figure 8:
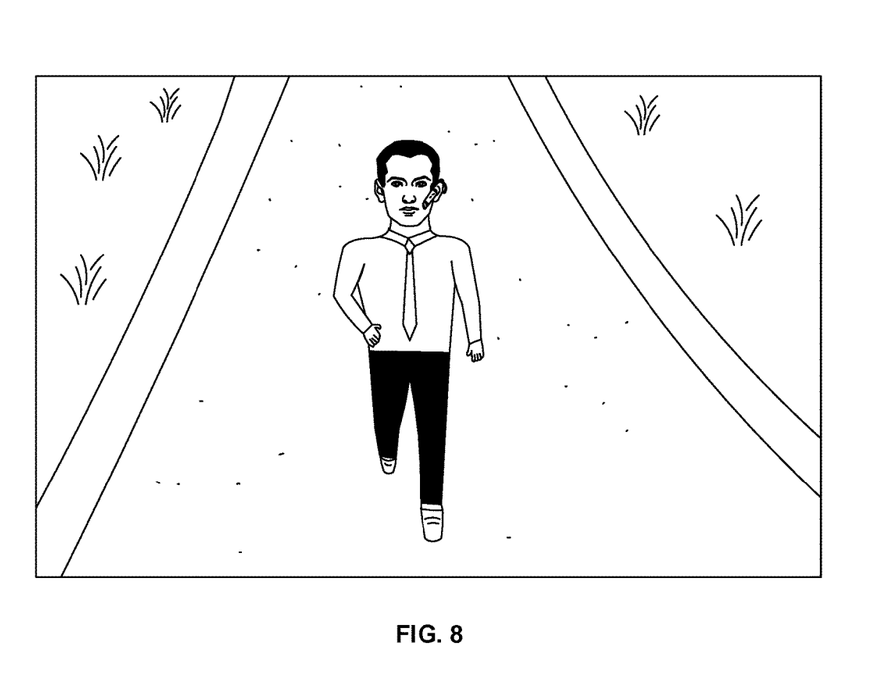

Now referring to FIGS. 6-8, as shown in FIG. 6 a touchless IVR assistance context can be identified as existing when the user's mobile device communicating with the IVR call is in a driving state. As discussed above, "driving" may be identified in several ways, including a location sensor indicating device movement above a threshold.

FIG. 7 shows that the touchless context may be identified as existing when the mobile device is configured in a meaningful location state, such as when the user is cooking or doing other chores requiring use of both hands. Meaningful locations can be determined using GPS matches with prior GPS locations in which the device previously has been configured to work on hands-free voice-driven mode of interaction.

Yet again, FIG. 8 illustrates that the touchless context may be identified as existing when the user (and hence device) is in walking or jogging state with an active wired and/or wireless headset connection as shown. In addition to the examples discussed above, detecting walking or jogging state with an active wired and/or wireless headset connection can include determining sensor-based in-pocket or in-bag detection, such as a proximity sensor on the device generating a signal indicating that another object is touching or is within, e.g., a millimeter of the device.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
   at least one processor; and
   storage accessible to the at least one processor, the storage comprising instructions executable by the processor to:
   identify that a context of the device indicates touchless interactive voice response (IVR) based at least in part on a signal from at least one location sensor, and identifying that communication is activated with at least one wireless headset;
   identify that an interactive voice response (IVR) prompt on a communication downlink indicates to select an option by using tactile input;
   receive voice input from a microphone;
   responsive to the context indicating touchless IVR, transmit at least one dual tone multi frequency (DTMF) tone on a communication uplink associated with the communication downlink based on the voice input from the microphone.

2. The device of claim 1, wherein the instructions are executable to: responsive to identifying that the IVR prompt indicates to a user to select an option by using tactile input, play on at least one speaker an audio prompt to speak a response to the IVR audio.

3. The device of claim 1, wherein the instructions are executable to: identify that the IVR prompt on the communication downlink indicates to a user to select an option by using tactile input at least in part by converting the IVR audio to text and identifying whether the text satisfies a match condition with at least one text in a database.

4. The device of claim 1, wherein the instructions are executable to: identify that the IVR prompt on the communication downlink indicates to a user to select an option by using tactile input at least in part by converting IVR graphic information to text and identifying whether the text satisfies a match condition with at least one text in a database.

5. The device of claim 1, wherein the instructions are executable to: dynamically load a grammar data structure to process the voice input from the microphone.

6. A method comprising:
   determining, at an electronic device, a context for an interactive voice response (IVR) system generating an audible menu;
   determining, at the electronic device, at least a portion of the IVR system necessitates tactile input;
   dynamically loading a grammar set to process a voice-based response corresponding to a tactile input;
   receiving and processing, at the electronic device, the audio input; and
   performing a function at the electronic device based on the processed audio input, wherein the dynamically loading a grammar set comprises:
   detecting a first numeral in the audible menu;
   correlating the first numeral with at least a first word following the first numeral in the menu, a first dual tone multi frequency (DTMF) data being correlated with both the first numeral and first word;
   detecting a second numeral in the audible menu;
   correlating the second numeral with at least a second word following the second numeral in the menu, a second DTMF data being correlated with both the second numeral and second word;
   wherein the audio input of the first word causes the first DTMF data to be sent and audio input of the first numeral causes the first DTMF data to be sent, and the audio input of the second word causes the second DTMF data to be sent and audio input of the second numeral causes the second DTMF data to be sent.

7. The method of claim 6, wherein determining at least a portion of the interactive voice response system necessitates tactile input comprises determining for the at least a portion of the interactive voice response system that a capability of voice input is not available.

8. The method of claim 6, wherein determining an IVR assistance context comprises determining that a device is in a driving state.

9. The method of claim 8, wherein detecting driving state is based at least in part on a location sensor indicating device movement above a threshold.

10. The method of claim 6, wherein determining an IVR assistance context comprises determining that a device is in walking or jogging state with an active wired and/or wireless headset connection.

11. The method of claim 10, wherein detecting walking or jogging state with an active wired and/or wireless headset connection comprises determining sensor based in-pocket or in-bag detection.

12. The method of claim 6, wherein determining an IVR assistance context comprises determining that a device is configured in a meaningful location state.

13. The method of claim 12, wherein meaningful location detection further comprises determining locations on which the device has been configured to work on hands-free voice-driven mode of interaction.

14. The method of claim 6, determining at least a portion of IVR call necessitates tactile input comprises executing speech processing on downlink channel audio and parsing the speech to text output to determine required actions to proceed with the IVR call corresponds to user providing tactile inputs.

15. The method of claim 6, wherein dynamically loading a grammar set to spot voice based response corresponding to tactile inputs comprises creating a grammar set on the fly corresponding to the options and variants associated with specific tactile input.

16. An apparatus, comprising:
 at least a first processor;
 at least one network adapter; and
 storage with instructions executable by the first processor for:
  identifying that a context of the apparatus indicates touchless interactive voice response (IVR) based on a signal from location sensor and identifying that communication is activated between the apparatus and wireless headset;
  responsive to the context indicating touchless interactive voice response (IVR), identifying whether an IVR prompt indicates to select an option by using tactile input;
  correlating an audio response to the IVR prompt to a dual tone multi frequency (DTMF) tone; and
  sending the DTMF tone on an uplink back to an IVR system.

17. The apparatus of claim 16, wherein the instructions are executable for:
 identifying that IVR call on an IVR downlink does not provide for a voice response option;
 receiving voice input from a microphone; and
 based on the voice input from the microphone, transmitting the DTMF tone.

18. The apparatus of claim 16, wherein the instructions are executable for: identifying that the IVR prompt on the communication downlink prompts a user to select an option by using tactile input at least in part by converting an IVR audio or video to text and identifying whether the text satisfies a match condition with at least one text in a database.

19. The apparatus of claim 16, wherein the instructions are executable for: dynamically generating a grammar data structure based on recognized terms in the IVR audio on the communication downlink to process the voice input from the microphone.

20. The device of claim 1, wherein the instructions are executable for identifying that the context indicates touchless IVR by identifying that communication is activated between the apparatus device and the wireless headset.

* * * * *